United States Patent [19]

Agostinelli et al.

[11] Patent Number: 5,317,666
[45] Date of Patent: May 31, 1994

[54] WAVEGUIDE NONLINEAR OPTICAL FREQUENCY CONVERTER WITH INTEGRAL MODULATION AND OPTIMIZATION MEANS

[75] Inventors: John A. Agostinelli, Rochester; Jose M. Mir, Webster; Joseph F. Revelli, Rochester, all of N.Y.

[73] Assignee: Eastman Kodak Company, Rochester, N.Y.

[21] Appl. No.: 953,925

[22] Filed: Sep. 29, 1992

[51] Int. Cl.$^5$ .............................................. G02B 6/10
[52] U.S. Cl. .................................... 385/122; 359/328; 385/141
[58] Field of Search ................ 359/326–332; 385/122, 1, 14, 40, 129, 131; 437/20, 21, 26, 51, 134

[56] References Cited

U.S. PATENT DOCUMENTS

| | | | |
|---|---|---|---|
| 5,036,220 | 7/1991 | Byer et al. | 385/122 X |
| 5,058,970 | 10/1991 | Schildkraut et al. | 385/122 X |
| 5,075,796 | 12/1991 | Schildkraut et al. | 385/122 X |
| 5,170,460 | 12/1992 | Aridsson et al. | 385/122 X |

OTHER PUBLICATIONS

E. J. Lim, M. M. Feyer, and R. L. Byer, Electron. Lett. 25, 174 (1989).
K. Mizuuchi, K. Yamamoto, and T. Taniuchi, Appl. Phys. Lett. 58, 2732 (1991).
E. J. Lim, M. M. Feyer, and H. M. Hertz, in Technical Digest of CLEO '91 (Baltimore, Md. 1991), paper CTuV3.
T. Senoh, Y. Fujino, Y. Tanabe, M. Ohthu, and K. Nakagawa, in 1991 Technical Digest, vol. 10 of CLEO '91 (Baltimore, Md. 1991) paper CWA6.
S. Fries and S. Bauschulte, Phys. Stat. Sol. (a) 125, 369 (1991).
C. J. vandes Peol, J. D. Bierlein, J. B. Brown, and S. Colak, Appl. Phys. Lett. 57 (20), 2074 (1990).
O. Eknoyan, W. K.–Burns, R. P. Moeller, and N. J. Frigo, Applied Optics 27(1), 114 (1988).
R. C. – Alferness, Appln. Phys. Lett. 36(7), 513 (1980).
A. Y. Wu, F. Wang, C. Juang, and C. Bustamante, Mat Res. Soc. Symp. Proc. vol. 200, 261 (1990).

*Primary Examiner*—Akm E. Ullah
*Attorney, Agent, or Firm*—Raymond L. Owens

[57] ABSTRACT

An optical, waveguide, quasi-phase-matching frequency converter has integral means to vary the efficiency of the quasi-phase-matching frequency conversion process resulting in intensity modulation of the device output; said frequency converter has integral means to optimize the quasi-phase-matching frequency conversion process resulting in optimum device output; and said frequency converter has integral input signal polarization mode conversion means in optional combination with the conversion optimization means for modulating the optimized device output. Methods for modulating and optimizing the quasi-phase-matching frequency converted signal by electro-optically controlling the dispersion of the frequency converting medium are also disclosed.

35 Claims, 3 Drawing Sheets

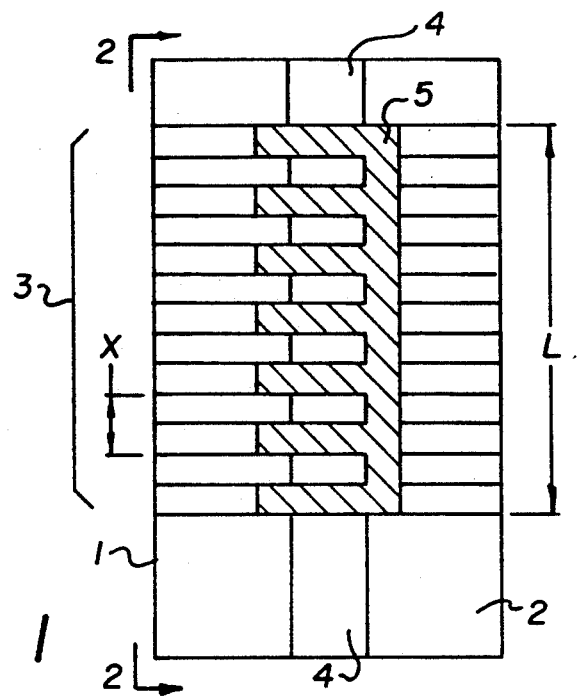
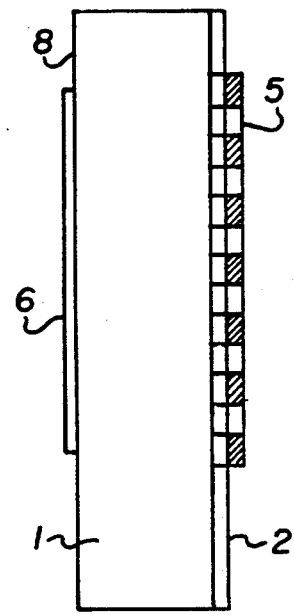
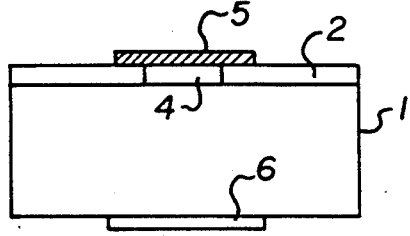
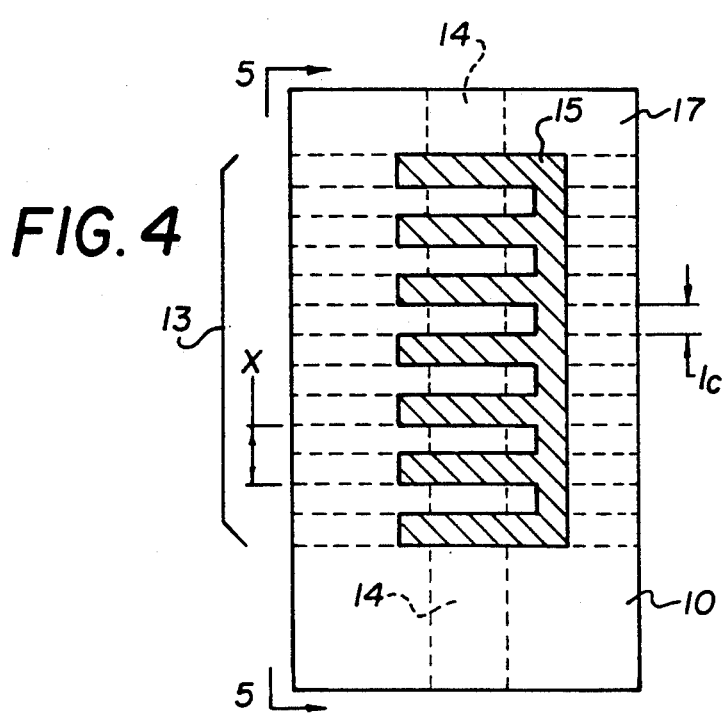
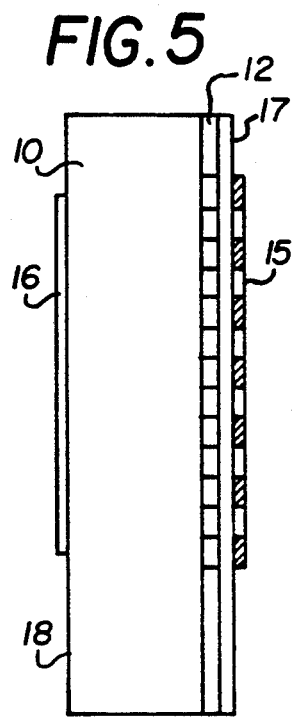
FIG. 1
FIG. 2
FIG. 3
FIG. 4
FIG. 5

WAVEGUIDE NONLINEAR OPTICAL FREQUENCY CONVERTER WITH INTEGRAL MODULATION AND OPTIMIZATION MEANS

BACKGROUND OF THE INVENTION

1. Field of the Invention

This invention relates generally to quasi-phase-matched optical frequency conversion and more particularly, first, to methods for intensity modulating frequency converted waves and for optimizing the efficiency of quasi-phase-matched optical frequency conversion; and, second, to the improvement of existing quasi-phase-matched optical frequency converters; the improvement consisting of integral intensity modulation means which both electro-optically frustrate the quasi-phase-matching condition and allow optimization of the quasi-phase-matching condition.

2. Description of the Related Art

Devices which employ quasi-phase-matching to achieve optical frequency conversion are well known in the art. They include frequency doublers, known in the art as second harmonic generation (SHG) devices, and frequency mixing devices. Optical frequency conversion by quasi-phase-matching (QPM) is generally dependent on nonlinear optical effects observed in waveguides, for example, formed by surface modification of preferred inorganic, bulk single crystal materials. Surface modification techniques used to form waveguides in these bulk crystal materials include proton exchange, in-diffusion of metal dopants, and out-diffusion of substrate constituents, all of which are well known in the art.

Alternatively, thin film waveguide frequency converters are under development. Quasi-phase-matched frequency conversion in inorganic nonlinear optical thin film waveguides is taught in a copending application of Agostinelli et al., while Khanarian et al., U.S. Pat. No. 4,865,406 teaches the use of nonlinear organic thin film waveguides to achieve SHG by quasi-phase-matching.

Intensity modulation of the frequency converted output is often desirable or required for the useful application of device output; for example, to write data onto an optical recording medium, to create a photonic data stream for optical communications, to create an image when the modulated light is further scanned in a raster format, and so on. The modulation of frequency converted light may be achieved either by modulating the input (fundamental frequency) light or by modulating the output (frequency converted) light. A wide variety of modulation techniques are known in the art. With respect to commercially important diode laser fundamental light generators, for example, it is convenient to directly modulate the input light by varying the current supplied to the diode laser. Although this method is convenient, it is ill-suited as a means for modulating quasi-phase-matched frequency converted light due to the sensitive relationship between the efficiency of quasi-phase-matched frequency converters and the input optical frequency. It is well known that the optical frequency of semiconductor diode laser output is highly temperature dependent and that the current supplied to the laser directly influences laser temperature. A constant current supply, therefore, is preferred when diode lasers are used as input sources for frequency converters employing quasi-phase-matching, and to modulate the frequency converted output by other means.

External modulation of frequency converted light is very well known in the art. Known means involve devices which use the electro-optic or acousto-optic effect, and these modulators may be discrete or integrated. Discrete devices include Pockels cells, acousto-optic deflectors and electro-optic deflectors; while Mach-Zehnder interferometers, electro-optic directional couplers, Bragg deflectors and total internal reflection waveguide crosses are examples of integrated devices. Although some of these techniques are compatible with quasi-phase-matching nonlinear optical frequency converter devices, their use considerably increases overall device complexity. In addition, these modulation techniques lack the degree of dynamic optimization of the efficiency of quasi-phase-matched frequency conversion offered by the the present invention.

Direct modulation of the second harmonic output from birefringently phase-matched bulk crystals is also known in the art. These means are inapplicable to quasi-phase-matching waveguide devices, however, since QPM frequency converters do not rely on birefringence to achieve phase-matching.

To summarize, presently utilized means for modulating quasi-phase-matched frequency converted light exhibit shortcomings which limit their ease of use and application utility.

SUMMARY OF THE INVENTION

The present invention relates to methods and devices for modulating and optimizing quasi-phase-matched frequency converted signals, including optical frequency signals. A method and a device herein disclosed rely on the fact that the efficiency of quasi-phase-matched frequency conversion depends on the dispersion of the QPM waveguide structure, and, that the dispersion may be controlled using the electro-optic effect.

In another aspect of the invention integral modulation means are used to selectively tune the quasi-phase-matching material dispersion thus maintaining optimum efficiency of the frequency conversion process. Less than optimum conversion efficiency results from drifts in temperature or input wavelength or from minute device fabrication errors.

An alternate form of the invention takes advantage of the dependence of the efficiency of quasi-phase-matching in nonlinear optical devices on the polarization state of the input light. The polarization state of the input light may be controlled using the electro-optic effect in a portion of the waveguide in advance of the quasi-phase-matching region. The sufficiently high second-order optical nonlinearity of typical QPM frequency converters inherently provides for electro-optic activity.

The present invention thus comprises a) methods for dynamic electro-optic control of quasi-phase-matched optical frequency conversion; and, b) quasi-phase-matched optical frequency converters having integral modulation means and conversion optimizing means for dynamically, electro-optically controlling the efficiency of quasi-phase-matched energy transfer.

In the first aspect of the invention, as noted above, the electro-optic effect is used to control the difference in the refractive indicies of the active, quasi-phase-matching region of the propagation medium for the input and output optical frequencies. When the index difference, or dispersion, of the active region is changed from its optimum value, the periodically poled QPM grating structure is placed out-of-tune for the input wavelength and the frequency converted output power is dramatically reduced. The output power can theoretically be reduced to zero; however, in practice, imperfections and inhomogeneities in the device structure will bring the minimum frequency converted output power, as a function of the electro-optic detuning, to a level above zero. Useful modulation depths are, nevertheless, achieved. In the embodiment disclosed, a variable voltage is supplied to a pair of electrodes in proximity to the active, QPM region of the waveguide structure. The variable voltage corresponds to the modulation control signal which in turn controls the dispersion characteristics of the waveguide. The geometry of the device is shown in FIG. 1. A waveguide layer 2 is located atop the substrate 1. The periodically poled active region 3 comprising, effectively, a characteristic length L over which the nonlinear dielectric susceptibility coefficient periodically alternates in sign (or, in other words, the region in which the crystal polar axis alternates periodically in orientation by 180°), exists within a channel waveguide 4. The modulator electrodes 5 and 6, finger electrodes in this case, are proximate to the active region and the bottom of the substrate, respectively.

In the second aspect of the invention, the voltage supplied to the electrodes is varied in order to tune the dispersion of the device so that the most efficient frequency conversion is achieved. Optimum modulation depth and device efficiency are obtained when the control voltage is switched between values corresponding to maximum and minimum optical output powers.

An alternate form of the invention is an improvement in an integrally modulated QPM frequency converter which results from the combination of a nonlinear optical QPM frequency conversion device with an electro-optical mode converter (polarization changer). The mode conversion means are located anterior to the QPM frequency conversion means and provide the capability of switching the polarization state of the input light between transverse electric (TE) and transverse magnetic (TM) polarization states prior to its entry into the active region of the waveguide. Since both the second-order nonlinear interactions and the waveguide dispersive characteristics are dependent on the optical polarization direction, a change in the polarization state of the input light can result in a dramatic decrease in the frequency converted output light power level. Modulation control is achieved by varying the voltage applied to the electro-optic polarization conversion means. The mode conversion means can further be combined with a QPM frequency converter having dispersion dependent optimization means as disclosed herein. Mode converters that rely on electro-optic activation are very well known in the art.

FIG. 1 is a top elevational view of the frequency converter showing the channel waveguide and finger electrodes.

FIG. 2 is a side elevational view of the frequency converter of FIG. 1.

FIG. 3 is an end view of the frequency converter.

FIG. 4 shows a top elevational view of the preferred embodiment of the invention.

FIG. 5 is a side elevational view of the device of FIG. 4.

Figure 8:
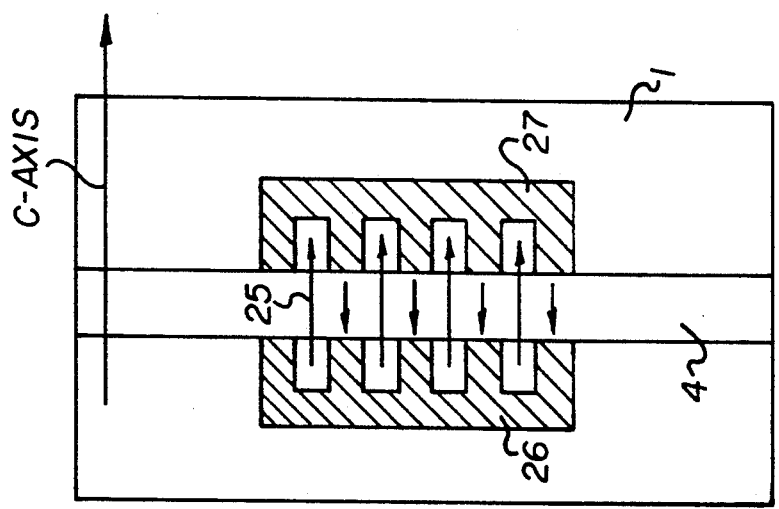

FIG. 8 schematically illustrates an alternative embodiment of a frequency converter with modulation and optimization means of the type herein described showing a film/substrate geometry wherein the c-axis of the thin film is oriented in a direction, as indicated, in a plane parallel to the substrate top surface (X-cut or Y-cut geometry).

Figure 9:
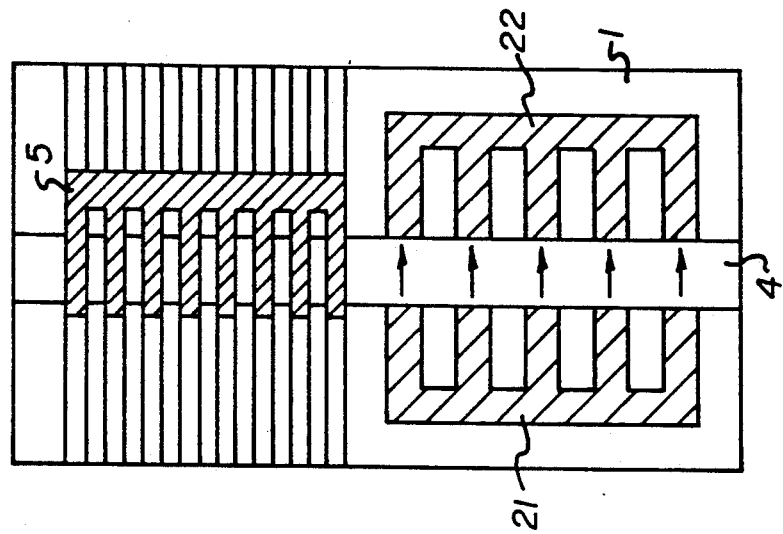

FIG. 9 schematically illustrates an exemplary embodiment of a thin film channel waveguide QPM frequency converter with optional optimization means and polarization mode conversion/modulation means located ahead of the active region of the waveguide in the form of a pair of electrodes lateral to a portion of the channel waveguide region.

DETAILED DESCRIPTION OF THE PREFERRED EMBODIMENT

The art recognizes $LiNbO_3$, $LiTaO_3$, and $KTiOPO_4$ as preferred nonlinear, ferroelectric, optical materials for waveguide devices which achieve frequency conversion by quasi-phase-matching. In a preferred embodiment of the invention direct integral modulation of quasi-phase-matched frequency converted output light is achieved in an inorganic $LiNbO_3$ thin film waveguide on a sapphire substrate. The device is shown schematically in FIG. 2. This embodiment incorporates an inorganic thin film waveguide rather than the more conventional surface modified $LiNbO_3$ bulk single crystal waveguide configuration. The invention can be applied to either; however, the thin film waveguide geometry allows a simpler analysis and a simpler detailed description of the invention. The invention could as well be applied to organic nonlinear optical thin film waveguides.

Figure 6:
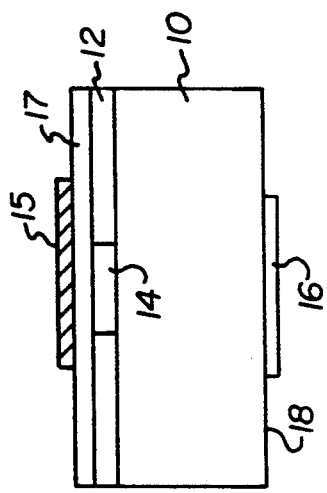
FIG. 6 is an end view of the device of FIG. 4 showing the added buffer layer.
Figure 7:
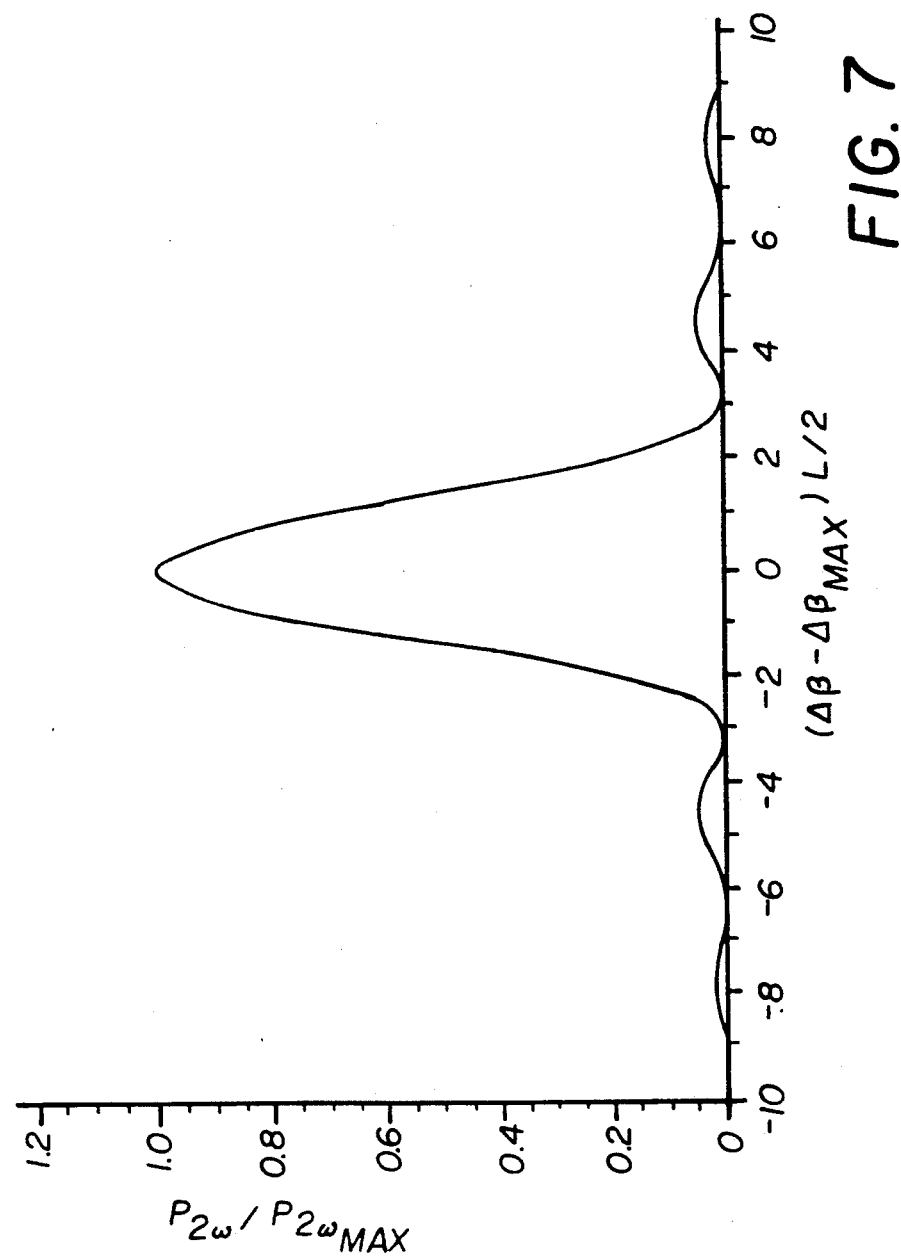
FIG. 7 is a plot of the ratio of frequency converted output power to maximum frequency converted output power as a function of the variation in the change in the effective refractive indices for the input and converted frequencies.

Referring to FIGS. 4, 5, and 6, the single crystal sapphire substrate 10 is a portion of a polished wafer in the (0001) orientation; that is, its surface is perpendicular to the sapphire c-axis direction (Z-cut geometry). The three-dimensionally oriented $LiNbO_3$ film 12 is grown on the sapphire surface by techniques which include sputtering, laser ablation, and electron beam coevaporation, or others which are well known in the art. It is known that $LiNbO_3$ films can be grown with their c-axis directions perpendicular to the (0001) sapphire surface. The c-axis perpendicular orientation of the thin film permits use of the $d_{33}$ nonlinear optical coefficient, which is the largest second-order coefficient in $LiNbO_3$. In this configuration, however, the input light must be polarized in a direction parallel to the c-axis direction of the $LiNbO_3$ film; a condition corresponding to transverse magnetic (TM) polarization in the waveguide. The film thickness is preferably such that only the lowest order TM waveguide mode is allowed.

The film is poled into a single domain by well known methods for poling ferroelectrics, and further contains a periodically poled portion or active region 13 effectively comprising a periodically sign-alternating (Positive-to-negative-to-positive), second-order dielectric susceptibility component having a predetermined grating period which is formed by conventional techniques for patterned domain reversal. The device also comprises a channel waveguide portion 14 which traverses and intersects the periodically poled portion according to conventional practice. The channel waveguide portion may be formed by methods according to either the thin film waveguide art or techniques used in the LiNbO$_3$ single crystal art. A simpler, planar waveguide structure is also applicable to the present invention. The active region may be usefully between 1 mm and 30 mm in length, and preferably between 3 mm and 20 mm, with the optimal length being between 5 mm and 15 mm. The channel waveguide portion extending beyond the active region 13 may have zero length or may extend on both sides of the active region depending on the application.

The control electrodes 15 and 16 are located proximate to the waveguide and are shown below the substrate and above the film, respectively. The lower electrode 16 has dimensions which correspond at least to the dimensions of the intersection of the channel waveguide portion 14 and the active region 13. Somewhat larger electrode dimensions are desirable in order to assure uniform electric fields in the area of intersection. The upper electrode 15 has a finger geometry whose period matches the grating period of the poled active region of the waveguide. Electrode 15, being in registration with the active region of the waveguide, could function as the electrode means to periodically pole the waveguide if such electrical means are employed.

It is preferable to include a buffer layer 17 between the upper electrode and the LiNbO$_3$ film to avoid unnecessary light loss in the waveguide portion which lies between the electrodes. The dielectric buffer layer should be non-absorbing and non-scattering (i.e. transparent) at both the input and the converted frequencies. It may be electrically insulating or conducting. SiO$_2$ is an example of a preferred inorganic insulating buffer layer material. Other examples include simple oxides (e.g. oxides of Ta, Al, etc.), fluorides (e.g. fluorides of Ca, Sr, Ba, Li, etc.), nitrides (e.g. Si), and more complex oxides, fluorides and nitrides that satisfy the optical requirements of said buffer layer. Organic materials are also useful as buffer layers. It is also possible to combine organic nonlinear optical layers with inorganic buffer layers. The buffer layer thickness should minimally be such that the evanescent field of the guided mode does not extend to the conducting upper electrode. The refractive index of the buffer layer must be below that of the nonlinear waveguide layer 12 in order that the condition for natural waveguiding is met. The specific refractive index of the buffer layer will influence the waveguide modes and cut-off thicknesses and must be taken into account in the design. In the preferred embodiment it can be assumed for simplicity that the buffer layer 17 extends over the entire LiNbO$_3$ film surface.

The thickness of the substrate 10 is determined by a tradeoff between desired mechanical rigidity and the required control voltage level across the device, since the electro-optic control function is an electric field-sensitive quantity. Minimum substrate thickness is about 50 micrometers. There is no advantage in having substrate thicknesses in excess of 1 mm in most applications. It is advantageous, however, to employ a substrate having a thickness capable of providing excellent mechanical properties while circumventing the problem of increased voltage requirements by milling the substrate bottom surface 18 in contact with electrode 16 thus reducing the voltage level required to produce the desired electric field.

In an exemplary embodiment, a first-order quasi-phase-matched frequency converter illustrates the principles of the present invention. For first-order QPM, the ferroelectric polarization direction is reversed periodically every coherence length $l_c$ along the propagation direction. This produces an active region 13 of the propagation medium, as shown in FIG. 2, having a periodically alternating second-order dielectric susceptibility component with a grating half-period equal to a coherence length. The coherence length is the propagation distance in the active region over which the fundamental input and frequency converted output waves accumulate a relative phase difference of $\pi$. The coherence length $$l_c = \pi/(k_{2\omega} - 2k_\omega)$$

where $k_{2\omega}$ and $k_\omega$ are the wave vector magnitudes at the second harmonic frequency, $2\omega$, and the fundamental frequency, $\omega$, respectively. Inside the waveguide, $$k_{2\omega} = \beta_{2\omega} = 4\pi N_{2\omega}/\lambda \text{ and}$$

$$k_\omega = \beta_\omega = 2\pi N_\omega/\lambda,$$

where $\beta_{2\omega}$ and $\beta_\omega$ are called the waveguide propagation constants; $N_{2\omega}$ and $N_\omega$ are the effective refractive indices of the waveguide at frequencies $2\omega$ and $\omega$, respectively, and $\lambda$ is the fundamental wavelength in free space. Thus within the waveguide, $l_c = \lambda/4(N_{2\omega} - N_\omega)$. $(N_{2\omega} - N_\omega)$ corresponds to the dispersion of the effective refractive index between $2\omega$ and $\omega$, and is related to the material dispersion $(n_{2\omega} - n_\omega)$. The optimum SHG efficiency for the QPM waveguide structure is achieved when the sign of the second-order dielectric susceptibility component is reversed every coherence length, $l_c$, over the active region of the waveguide. If the period of reversal and the coherence length are not matched, then less efficient quasi-phase-matched frequency conversion will result. It is evident that for a fixed QPM grating period, the conversion efficiency can be decreased by altering the quantity $(N_{2\omega} - N_\omega)$, thereby causing a violation of the requirement for matching. Similarly, one may bring a mismatched structure into the matched condition, thereby optimizing the efficiency of the device. The material dispersion $(N_{2\omega} - N_\omega)$ may be electro-optically altered by applying a voltage to the pair of electrodes 15 and 16 of FIG. 2. To determine the dispersion in the effective index it is necessary to take the material dispersion and the waveguide parameters into account.

For mismatched QPM, the second harmonic wave power, $P_{2\omega}$, will follow a dependence given by $$P_{2\omega} = P_{2\omega\ max} \sin^2[(\Delta\beta - \Delta\beta_{max})L/2]/[(\Delta\beta - \Delta\beta_{max})L/2]^2,$$

where $P_{2\omega\ max}$ is the matched second harmonic wave power, $\Delta\beta = \beta_{2\omega} - 2\beta_\omega$, $\Delta\beta_{max}$ is $\Delta\beta$ under matched conditions, and L is the interaction length. L corresponds to the length of the QPM active region 13. $P_{2\omega}/P_{2\omega\ max}$ is plotted as a function of $(\Delta\beta - \Delta\beta_{max})L/2$, in FIG. 3. The first zero occurs at $(\Delta\beta - \Delta\beta_{max})L/2 = \pi$; that is, when the dispersion is changed from that value giving optimum conversion efficiency by an amount equal to $\pm m\lambda/2L$ where m is an integer. The quantity $\Delta\beta$ may be controlled by applying an electric field E to the electrodes 15 and 16 in FIG. 2. Thus, the second harmonic wave or frequency converted wave power will attain a minimum value, theoretically zero, when $(\Delta\beta(E)-\Delta\beta_{max})L/2=\pi$; that is, when $[N_{2\omega}(E)-N_\omega(E)]-[N_{2\omega}-N_\omega]=\lambda/2L$. Stated otherwise, the modulated frequency converted output is brought to a minimum level by applying an electric field E such that the dispersion of the effective index is changed by a quantity given by $\lambda/2L$. Using the conditions L=2 cm and $\lambda$=860 nm, $\lambda/2L$=0.00021.

Given the geometry of the quasi-phase-matching frequency converter, and the TM polarization of the input light, the relevant electro-optic tensor component involved is the $r_{33}$ component. For the present situation, with the input polarization direction and the applied electric field direction parallel to the $LiNbO_3$ c-axis direction, the change in the material refractive index, $\Delta n$, as a function of applied electric field E, is given by $\Delta n(E)=-n^3 r_{33} E/2$, where n in the present case is the $LiNbO_3$ extraordinary refractive index, $n_e$. The quantity E is directly proportional to the applied voltage V, the constant of proportionality relating to the electrode separation, buffer layer thickness, and the dielectric constants of the electro-optic and buffer layer materials. In the typical occurrence where the buffer layer thickness is much smaller than the electrode separation, and their dielectric constants are of the same order, the electric field E is given approximately by E=V/d where d is the electrode separation. The invention is possible because the quantity $\Delta n(E)$ is dependent on the optical frequency. With lightwaves at frequencies $2\omega$ and $\omega$ present in the QPM structure, $$\Delta n_\omega(E)=-n^3_\omega r_{33}(\omega)E/2 \text{ and}$$

$$\Delta n_{2\omega}(E)=-n^3_{2\omega} r_{33}(2\omega)E/2.$$

Thus it can be seen that, in general, $\Delta n_{2\omega}(E)-\Delta n_\omega(E)$, is nonzero, so that the application of a transverse electric field across the waveguide will change the dispersive characteristic of the device material.

Because of the periodically poled nature of the waveguide in the active region, $\Delta n(E)$ changes sign from segment to segment when a field is applied in one direction. Thus $\Delta n_{2\omega}(E)-\Delta n_\omega(E)$ also changes sign. Under the application of application of a uniform electric field over the QPM structure, the overall change in dispersion will average to zero for a mode propagating through the active region. An overall change in dispersion can be simply realized by applying the electric field only across those segments for which the ferroelectric polarization direction is constant. This requires the use of a finger electrode geometry for the upper electrode, which must be in registration with those segments of the active region having constant ferroelectric polarization direction. With the application of the periodic field, the average change in dispersion within the active region will be one-half of the change induced in each segment in which the electric field is applied.

With respect to the description of the present embodiment, an input wavelength of 860 nm is assumed. Such a wavelength may be conveniently produced by commercial diode lasers. The second harmonic wavelength is thus 430 nm. From the published literature it can be found that some interpolation that for $LiNbO_3$, $n_3$(860 nm)=2.168; $n_e$(430 nm)=2.305; $r_{33}$(860 nm)=$29.9\times 10^{-12}$ m/V; and $r_{33}$(430 nm)=$34.9\times 10^{-12}$ m/V. Thus, the changes in refractive indices as a function of applied electric field at the optical frequencies $\omega$ and $2\omega$ are given by $$\Delta n_{2\omega}(E)=(-2.13\times 10^{-10})E, \text{ and}$$

$$\Delta n_\omega(E)=(-1.52\times 10^{-10})E$$

where E is in V/m.

In the present example, a waveguide thickness of 0.2 micrometers is assumed. The refractive indices for the substrate and buffer materials are taken as the following known values:

N(860 nm)=1.453 n(430 nm)=1.467 (for $SiO_2$); and n(860 nm)=1.760; and n(430 nm)=1.781 (for sapphire).

Standard waveguide mode analysis, using the parameters listed above, yields for the values of the effective refractive indices at $\omega$ and $2\omega$, for the $TM_0$ mode $N_\omega$=1.828263 and $N_{2\omega}$=2.138661.

Under the application of an electric field of $-3.22\times 10^5$ V/m ($-3.22$ kV/cm), the extraordinary refractive indices of the $LiNbO_3$ become $n_e$(860 nm)=2.1680489 and $n_3$(430 nm)=2.3050686.

With the field applied, therefore, the effective indices are given by $N_\omega(E=-3.22$ kV/cm$)$=1.828285 and $N_{2\omega}(E=-3.22$ kV/cm$)$=2.138725.

The change in the dispersion of the effective indices, as a result of the applied field, $[N_{2\omega}(E=-3.22$ kV/cm$)-N_\omega(E=-3.22$ kV/cm$)]-[N_{2\omega}-N_\omega]$=0.000042.

Since only one-half of the interaction length experiences the applied electric field, the effective change in the dispersion of the effective index is 0.000021.

Thus, the application of a field with a magnitude of 3.22 kV/cm, for the present specific embodiment, meets the requirements for causing the second harmonic output power to reach the first minimum, as shown in FIG. 3. Under the assumption of a practical electrode separation of 300 micrometers, the above field magnitude corresponds to an applied voltage of only 96.6 V.

Other embodiments of the invention, for which the electrode separation is much smaller than 300 micrometers, will require correspondingly lower control voltages to achieve the objects of the invention. Such smaller electrode separations may be realized by the substrate milling procedure described above, or by locating the lower electrode atop the substrate but below the nonlinear optical waveguide layer. Such a configuration is achievable with the thin film waveguide embodiments of the invention. Of course, it is preferred that a second buffer layer be included between the lower electrode and the thin film nonlinear optical layer to prevent loss of guided light power due to absorption in the electrode.

In another embodiment of the invention, the c-axis direction of the LiNbO$_3$ thin film is oriented transversely parallel to the substrate surface; that is, in an X-cut or Y-cut geometry, as illustrated by FIG. 4. To make use of the large d$_{33}$ nonlinear coefficient in this geometry the sign-alternating dielectric susceptibility component 25 must also be periodic in a plane parallel to the waveguide surface. This can be accomplished by positioning a pair of finger electrodes 26, 27 proximate to the waveguide top surface and on each side of the channel portion 4 of the waveguide.

An important aspect of the present invention rests in its capability to achieve dynamic optimization of the efficiency of QPM frequency conversion by electro-optical control of the dispersion of the active waveguide region. The applied electric field needed to compensate for a drift in the wavelength of the input light, for QPM second harmonic generation, in the preferred embodiment, can be calculated. The device is designed and realized around as assumed coherence length $l_c = \lambda/4(N_{2\omega} - N_\omega)$, where the grafting half-period of the directionally alternating nonlinear optical components comprising the active region is fixed at a value $l_c$. It is clear that a drift in $\lambda$ from the design value will result in degradation of frequency conversion efficiency. It is also evident that the drift may be compensated by a change in $(N_{2\omega} - N_\omega)$. Such a change may be accomplished by the application of a specific electric field to the active region of the waveguide device. For the present specific embodiment, the change in the dispersion of the effective index, $\Delta[N_{2\omega}(E) - N_\omega(E)]$, for segments in which an electric field is applied, is given approximately by $(1.29 \times 10^{-8})E$, where E is in kV/cm. A wavelength drift $\Delta\lambda$ can thus be compensated for by a change in the dispersion of the effective index given by $$\Delta\lambda/\lambda = \Delta[N_{2\omega}(E) - N_\omega(E)]/2[N_{2\omega} - N_\omega];$$

the factor of $\frac{1}{2}$ arising due to the change in dispersion over only one-half of the active region. For $\lambda = 860$ nm and $[N_{2\omega} - N_\omega] = 3104$, as given above, a wavelength shift may be compensated by a field E of 5.98 kV/cm per angstrom shift.

Essential elements for the realization of the dynamic optimization of the efficiency of the device include detection and electrode driver means which sample the device output and supply the required control signal to the electrodes in order to maintain the maximum output power. Said detection and sampling means can be integrated with the device in a manner taught in U.S. Pat. No. 5,064,684, or it may be done by discrete components.

In an alternate form of the invention, noted above, polarization mode conversion means are integrally combined with a thin film quasi-phase-matching frequency converter. The mode converter means are located anterior to the periodically poled active region of the waveguide, as shown in FIG. 9. The frequency converter device is assumed, for simplicity, to be identical to the device illustrated in FIG. 1, and described elsewhere herein, with the optical exception of the dispersion control means provided by electrodes 5 and 6. As shown in FIG. 9, electrodes 21 and 22, which represent the mode conversion means, are located such that they laterally surround the channel waveguide portion 4.

The mode converter noted immediately above is described in detail by Alferness in Appl. Phys. Lett. 36(7), April 1980. Alferness achieved efficiency of TE to TM conversion in excess of 99% using off-diagonal component of the electro-optic tensor which couple orthogonal light polarizations; specifically the r$_{51}$ coefficient.

The result reported were realized in a titanium in-diffused waveguide in a Z-cut single crystal of LiNbO$_3$. Due to birefringence in LiNbO$_3$, however, the effective refractive indices, $N_{TE}$ and $N_{TM}$, for the TE and TM modes are different and, thus, phase matching is not automatic. By introducing a periodicity in the electrode structure disclosed by Alferness such that $$2\pi/\lambda_o(N_{TE} - N_{TM}) = 2\pi/\Lambda,$$

where $\lambda_o$ is the freespace wavelength and $\Lambda$ is the period of the electrode structure, phase matching can be accomplished. With respect to the present invention, efficient conversion to the blue region of the spectrum by quasi-phase-matched second harmonic generation is possible when the mode converter output is TM polarized. In the case when the device input signal is supplied by a diode laser, producing characteristics TE mode output, frequency conversion to blue light results only when the mode converter is activated. The modulation contrast of the blue output will thus be high.

The wavelength bandwidth B of the mode converter is inversely proportional to the total number of electrode fingers N of the mode converter electrode structure. The FWHM bandwidth is given approximately by $B/\lambda_o = 1/N$, where B has the same units as $\lambda_o$. Thus the mode converter bandwidth may be controlled by choosing an N value which is proportional to the interaction length, i.e., the electrode length, of the mode converter device.

The invention has been described in detail with particular reference to preferred and exemplary embodiments thereof, but it will be understood that variations and modifications can be effected within the spirit and scope of the invention as described by the claims to follow.

What is claimed is:

1. A method for converting the frequency $\omega_{on}$ of an input signal to create an output signal having frequency $\omega_{out}$ and modulating the intensity of the output signal, comprising the steps of:

(a) applying the input signal to a waveguide including a variable dispersion, nonlinear active region of length L having a periodically poled grating of period X for quasi-phase-matching;

b) quasi-phase-matching the input signal and the output signal;

c) varying the dispersion of the active region to maintain a coherence length between the input and output signals equal to (n/2)X, where n equals an odd integer; and d) one of discretely and continuously changing the dispersion from a value for optimum frequency conversion by an amount equal to plus or minus $m\lambda/2L$ where m is an integer and $\lambda$ is the free space wavelength, to produce less than optimum frequency conversion.

2. The method of claim 1 in which the step of varying the dispersion of the active region comprises the step of applying an electric field across the active region.

3. A method for converting the frequency $\omega_{in}$ of an input signal to create an output signal having frequency $\omega_{out}$ and modulating the intensity of the output signal, comprising the steps of:
 (a) inputting the input signal into a waveguide including a nonlinear active region having a length L and a periodically poled grafting of period X, in which the input signal has one of a TM and a TE polarization state;
 (b) switching the polarization state of the input signal between the TE and TM polarization states; and
 (c) quasi-phase-matching the input signal and the output signal.

4. The method of claim 3 in which the step of switching the polarization of the input signal between the TE and TM polarization states comprises the step of applying an electric field to a portion of the waveguide anterior to the active region to create an electro-optic effect.

5. A method for converting the frequency $\omega_{in}$ of an input signal to create an output signal having frequency $\omega_{out}$ and optimizing the efficiency of the frequency change, comprising the steps of:
 (a) inputting the input signal into a waveguide including a variable dispersion, nonlinear active region having a length L and a periodically poles grating of period X;
 b) varying the dispersion of the active region to maintain a coherence length between the input and output signals equal to the value (n/2)X, where n equals an odd integer;
 c) quasi-phase-matching the input signal and the output signal; and
 (d) monitoring the power of the output signal while electro-optically varying the dispersion of the active region to maintain optimum output signal power.

6. The method of claim 5 wherein varying the dispersion comprises the step of applying an electric field across the active region.

7. A method for converting the frequency $\omega_{in}$ of a polarized input signal to create an output signal having frequency $\omega_{out}$ and modulating the intensity of the output signal, comprising the steps of:
 (a) inputting the input signal into a waveguide including a variable dispersion, nonlinear active region having a length L and a periodically poled grating of period X;
 (b) alternating the polarization state of the input signal between one of a TE and TM polarization state prior to propagating the signal through the active region;
 (c) quasi-phase-matching the input signal and the output signal; and
 (d) changing the dispersion of the active region to maintain a coherence length between the input and output signals equal to one-half of the grating period of the active region.

8. The method of claim 1 or 2 wherein the step of applying an electric field across the active region comprises the step of creating an electric field over every other half-period of the active region wherein said half-period regions have constant ferroelectric polarization directions.

9. A method for converting the frequency $\omega_{in}$ of an input signal to create an output signal having frequency $\omega_{out}$ and modulating the intensity of the output signal, comprising the steps of:
 (a) inputting the input signal into a waveguide including a variable dispersion, nonlinear active region having a length L and a periodically poled grating of period X for quasi-phase-matching, in which the input signal has one of a TM and a TE polarization state;
 (b) switching the polarization state of the input signal between the TE and TM polarization states; and
 (c) quasi-phase-matching the input signal and the output signal.

10. The method of either of claim 1, 3, 5 or 7 wherein the input and output signals are optical frequency signals.

11. The method of claim 7 in which the step of changing the dispersion of the active region comprises the step of applying an electric field across the active region.

12. A quasi-phase-matching frequency converter for producing an intensity modulated output signal of frequency $\omega_{out}$ from an input signal of frequency $\omega_{in}$, where $\omega_{in}$ is different from $\omega_{out}$, comprising:
 (a) a waveguide including an active region of characteristic length L having quasi-phase-matching frequency conversion means and variable dispersion; and
 (b) integral modulation means further comprising means for varying the efficiency of quasi-phase-matched frequency conversion from the input signal of frequency $\omega_{in}$ to the output signal of frequency $\omega_{out}$ in the waveguide.

13. The frequency converter of claim 12 wherein the means for varying the efficiency of frequency conversion further comprises means for electro-optically controlling the dispersion of the active region.

14. A quasi-phase-matching frequency converter for producing an intensity modulated output signal of frequency $\omega_{out}$ from an input signal of frequency $\omega_{in}$, where $\omega_{in}$ is different from $\omega_{out}$, comprising:
 (a) a waveguide including an active region of characteristic length L having quasi-phase-matching frequency conversion means; and
 (b) integral modulation means further comprising means for selectively alternating the polarization mode of the input signal prior to propagating it through the active region.

15. The frequency converter of claim 14 wherein the means for alternating the polarization mode of the input signal further comprises means for alternating the polarization mode between one of a TE and TM polarization state.

16. A quasi-phase-matching frequency converter for optimizing the efficiency of quasi-phase-matched frequency conversion from an input signal of frequency $\omega_{in}$ to an output signal of frequency $\omega_{out}$, where $\omega_{in}$ is different from $\omega_{out}$ comprising:
 (a) a waveguide including an active region of characteristic length L having quasi-phase-matching frequency conversion means and variable dispersion; and
 (b) integral means for electro-optically varying the dispersion of the active region;
 (c) detecting means opto-electronically responsive to the output signal for continuously measuring the output signal power, and feedback means for dynamically controlling the dispersion varying means.

17. The frequency converter of claim 16 further comprising in combination:
(a) integral input signal polarization mode conversion means located ahead of the active region for selectively alternating the polarization mode of the input signal prior to propagating it through the active region.

18. The frequency converter of either claim 15 or claim 17 wherein alternating the polarization mode of the input signal further comprises means for applying an electric field across the waveguide anterior to the active region.

19. The frequency converter of either claim 13, 16 or 17 wherein means for electro-optically varying the dispersion of the active region further comprises means for creating an electric field in the active-region of the waveguide.

20. The device of either of claim 12, 16 or 17 wherein the quasi-phase-matching frequency conversion means comprise first-order said means.

21. The frequency converter of either of claim 12, 14, 16, or 17 wherein the input and output signal frequencies comprise optical signal frequencies.

22. The frequency converter of claim 19 wherein the means for creating an electric field in the active region of the waveguide comprises a pair of conducting electrodes in proximity to a portion of the waveguide, further comprising a top electrode in proximity to the active region and a bottom electrode in proximity to the bottom surface of the substrate.

23. The device of claim 22 wherein the electrodes are metal.

24. The frequency converter of claim 22 wherein the top electrode has a finger geometry for creating an electric field only in every other half-period region of the active region having a permanent ferroelectric polarization.

25. The frequency converter of claim 22 comprising at least one non-scattering, non-absorbing buffer layer interposed between each electrode and the waveguide.

26. The device of either claim 12, 14, 16 or 17 wherein the waveguide comprises a nonlinear optical waveguide.

27. The device of claim 26 wherein the nonlinear optical waveguide comprises a surface modified, bulk inorganic crystalline, nonlinear optical material.

28. The device of claim 26 wherein the nonlinear optical waveguide comprises:
(a) a substrate having an index of refraction $n_s$; and
(b) an optical thin film having an index of refraction $n_f$, supported by the substrate, wherein $n_f > n_s$.

29. The device of claim 28 wherein the thin film material comprises a non-scattering, non-absorbing inorganic, nonlinear, noncentrosymmetric, ferroelectric, crystalline material and further wherein the substrate comprises a non-scattering, non-absorbing monocrystalline structure.

30. The device of claim 28 wherein the optical thin film material comprises an organic material.

31. The device of claim 29 wherein the thin film material comprises a material selected from a group of materials consisting of $LiTaO_3$, $LiNbO_3$, $LiNb_xTa_{1-x}O_3$ ($0<x<1$), $KNbO_3$, $KTa_xNb_{1-x}O_3$ ($0<x\leq 0.7$), $\beta-BaB_2O_4$, $Ba_2NaNb_5O_{15}$, $KTiOPO_4$, $KTiOAsO_4$, $BaTiO_3$, $LiIO_3$, $ZnO$ and PLZT compositions having permanent ferroelectric polarizations.

32. The device of claim 29 wherein the substrate comprises a material selected from a group of materials consisting of sapphire (monocrystalline $Al_2O_3$), MgO, LiF, Y:$ZrO_2$, Ca:$ZrO_2$, $LiTaO_3$, $SrTiO_3$, $LaAlO_3$, $LaGaO_3$, $NdGaO_3$, quartz, and $MgAl_2O_4$.

33. The device of claim 28 wherein the optical waveguide comprises a thin film/substrate combination selected from a group of combinations consisting of $LiTaO_3$/sapphire, $LiNbO_3$/sapphire, $LiTaO_3$/MgO, $LiNbO_3$/MgO and $LiNbO_3$/$LiTaO_3$.

34. The device of claim 26 wherein the waveguide comprises a channel waveguide.

35. The method of either claim 1, 3, 4, 7 or 9 wherein the quasi-phase-matching frequency conversion comprises first-order quasi-phase-matching.

* * * * *